United States Patent [19]
Johnson

[11] Patent Number: 6,036,429
[45] Date of Patent: Mar. 14, 2000

[54] HIGH SPEED ARTICLE RETRIEVAL SYSTEM

[75] Inventor: Darrell B. Johnson, Fort Collins, Colo.

[73] Assignee: CBW Automation, Inc., Fort Collins, Colo.

[21] Appl. No.: 08/916,739

[22] Filed: Aug. 19, 1997

Related U.S. Application Data

[63] Continuation of application No. 08/473,001, Jun. 6, 1995, abandoned.

[51] Int. Cl.[7] .................................................. B65G 25/00
[52] U.S. Cl. ............................................................ 414/752
[58] Field of Search ........................ 198/468.4; 414/225, 414/752, 718; 425/436 RM, 444, 537; 384/42; 212/350

[56] References Cited

U.S. PATENT DOCUMENTS

| | | | |
|---|---|---|---|
| 3,688,930 | 9/1972 | Shumaker | 414/718 |
| 3,690,742 | 9/1972 | Sung | 384/42 |
| 4,168,008 | 9/1979 | Granryd | 212/350 |
| 4,571,320 | 2/1986 | Walker | 414/752 |
| 5,055,091 | 10/1991 | Morris et al. | 384/42 |
| 5,234,328 | 8/1993 | Willson et al. | 425/139 |
| 5,549,374 | 8/1996 | Krivec | 384/42 |

FOREIGN PATENT DOCUMENTS 202545  11/1986  European Pat. Off. ............... 212/350

*Primary Examiner*—Joseph E. Valenza
*Attorney, Agent, or Firm*—William E. Hein

[57] ABSTRACT

A retrieval system for rapidly removing articles from a plastic molding machine or other manufacturing process includes two pairs of lightweight non-metallic telescoping retrieval tubes arranged for telescoping motion into and out of an open mold. Each pair of telescoping retrieval tubes is coupled to a pair of slidable bearing tubes. A movable one of each pair of retrieval and bearing tubes is driven in concert by a low inertia cable or other drive system. A fixed one of each of each pair of retrieval and bearing tubes includes longitudinal strips of plastic bearing material.

9 Claims, 4 Drawing Sheets

HIGH SPEED ARTICLE RETRIEVAL SYSTEM

CROSS REFERENCE TO RELATED APPLICATION

This application is a continuation of application Ser. No. 08/473,001, filed Jun. 6, 1995, now abandoned.

REFERENCE TO RELATED PATENT

This application is related to and incorporates by reference the subject matter of U.S. Pat. No. 5,234,328.

BACKGROUND AND SUMMARY OF THE INVENTION

This invention relates generally to article handling apparatus and more specifically to an apparatus for rapidly removing molded articles from plastic molding machines, as well as articles formed by various other manufacturing processes. A number of systems are known in the prior art for removing molded articles following ejection of those parts from a conventional injection molding machine, for example. Included are simple systems in which molded articles are permitted to drop from the mold after ejection, labor intensive manual systems, conveyor systems that transport the articles after they have been ejected, and more complex mechanical grasping and suction systems that serve to remove the ejected articles. The prior art manual systems result in contamination of dropped articles and the need for additional subsequent handling. The prior art mechanical grasping and suction systems are disadvantageous in that most of them suffer from slow operating speeds. In today's manufacturing processes, it is increasingly important to maximize the output of manufactured articles to control the cost of production and thereby maintain a competitive position in the marketplace. This need for high output is particularly important in the plastic molding industry, for example, where molding cycles may be no more than a few seconds. The production rate in this industry has been limited by the inability of prior art article handling devices to rapidly retrieve molded parts from a mold so that a new molding cycle may begin.

It is therefore a principal object of the present invention to provide a retrieval system for rapidly removing articles from a plastic molding machine or other manufacturing process to significantly shorten the manufacturing cycle time over prior art manufacturing processes that employ automated article retrieval systems. The speed advantage afforded by the present invention is achieved by realizing acceleration rates on the order of 26 G's as compared to acceleration rates in prior art article retrieval systems of 6–10 G's.

This and other objects are accomplished in accordance with the illustrated preferred embodiment of the present invention by providing two pairs of lightweight non-metallic telescoping retrieval tubes arranged for telescoping motion into and out of an open mold. Each pair of telescoping retrieval tubes is coupled to a pair of telescoping bearing tubes. The retrieval and bearing tubes are driven in concert by a low inertia cable drive system. Each of the telescoping pairs of retrieval and bearing tubes includes strips of plastic bearing material.

DETAILED DESCRIPTION OF THE INVENTION

Figure 1:
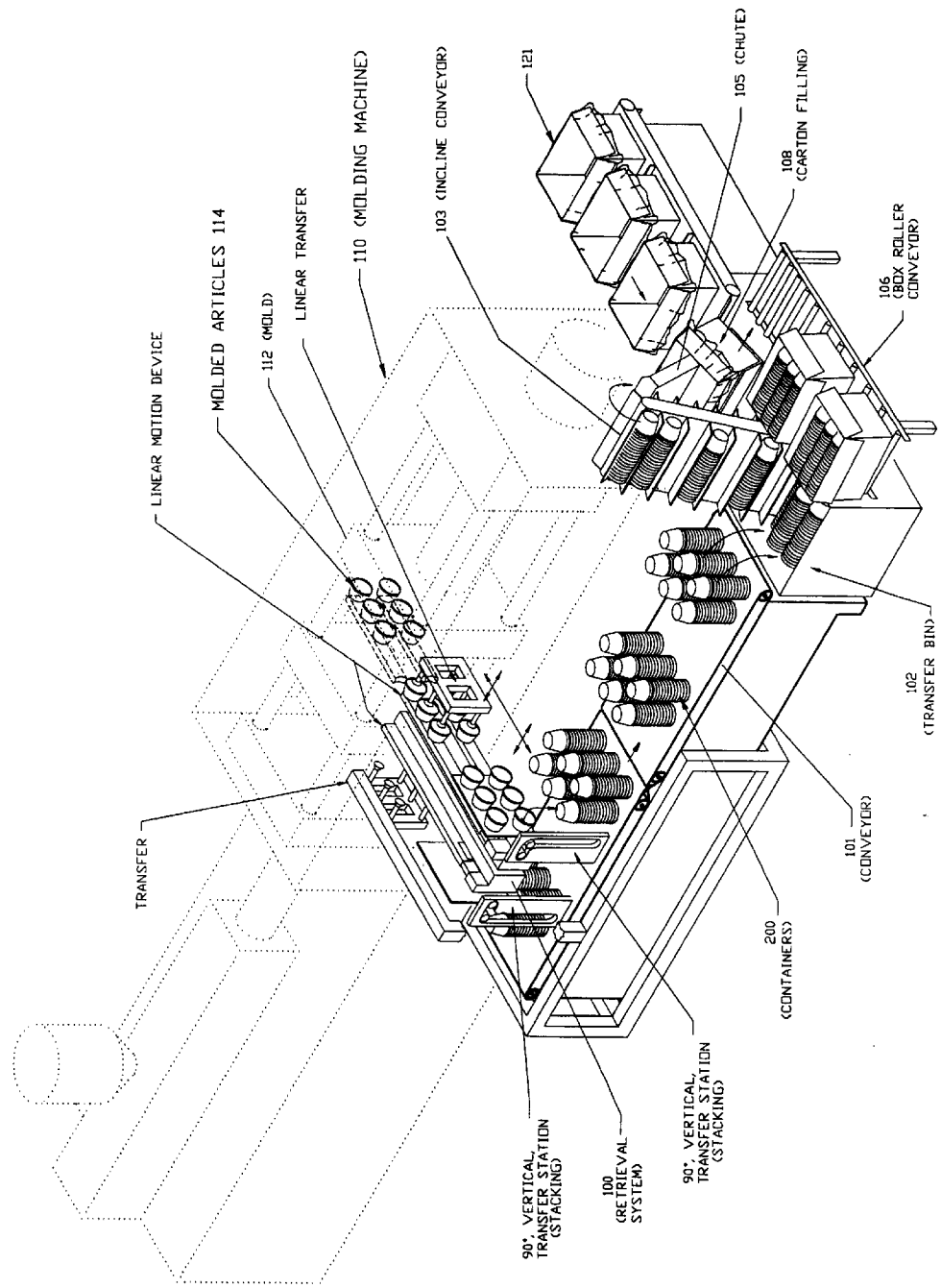
FIG. 1 is an overall pictorial diagram illustrating the article retrieval system of the present invention positioned for removing molded parts from a conventional plastic molding machine.

Referring generally to FIG. 1, there is shown an article retrieval system 100 positioned in relationship to a conventional molding machine 110 such that molded articles 114 are automatically rapidly removed from a mold 112 controlled by molding machine 110 at the completion of each molding cycle. The articles 114 so removed may then be oriented and routed for further processing, as desired, by an apparatus illustrated generally in FIG. 1 that does not form part of the present invention.

Figure 2:
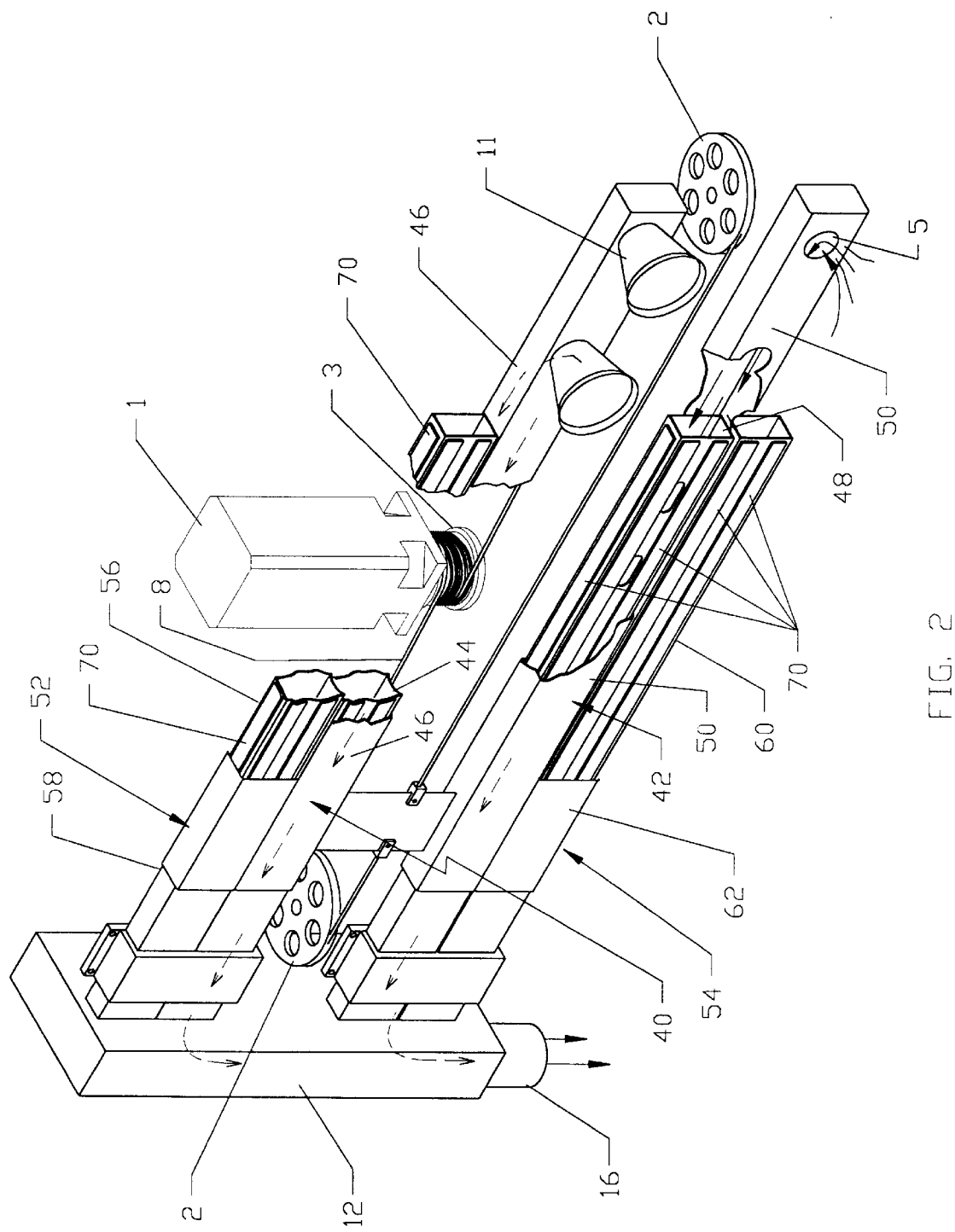
FIG. 2 is a more detailed pictorial diagram illustrating the article retrieval system of FIG. 1.
Figure 3:
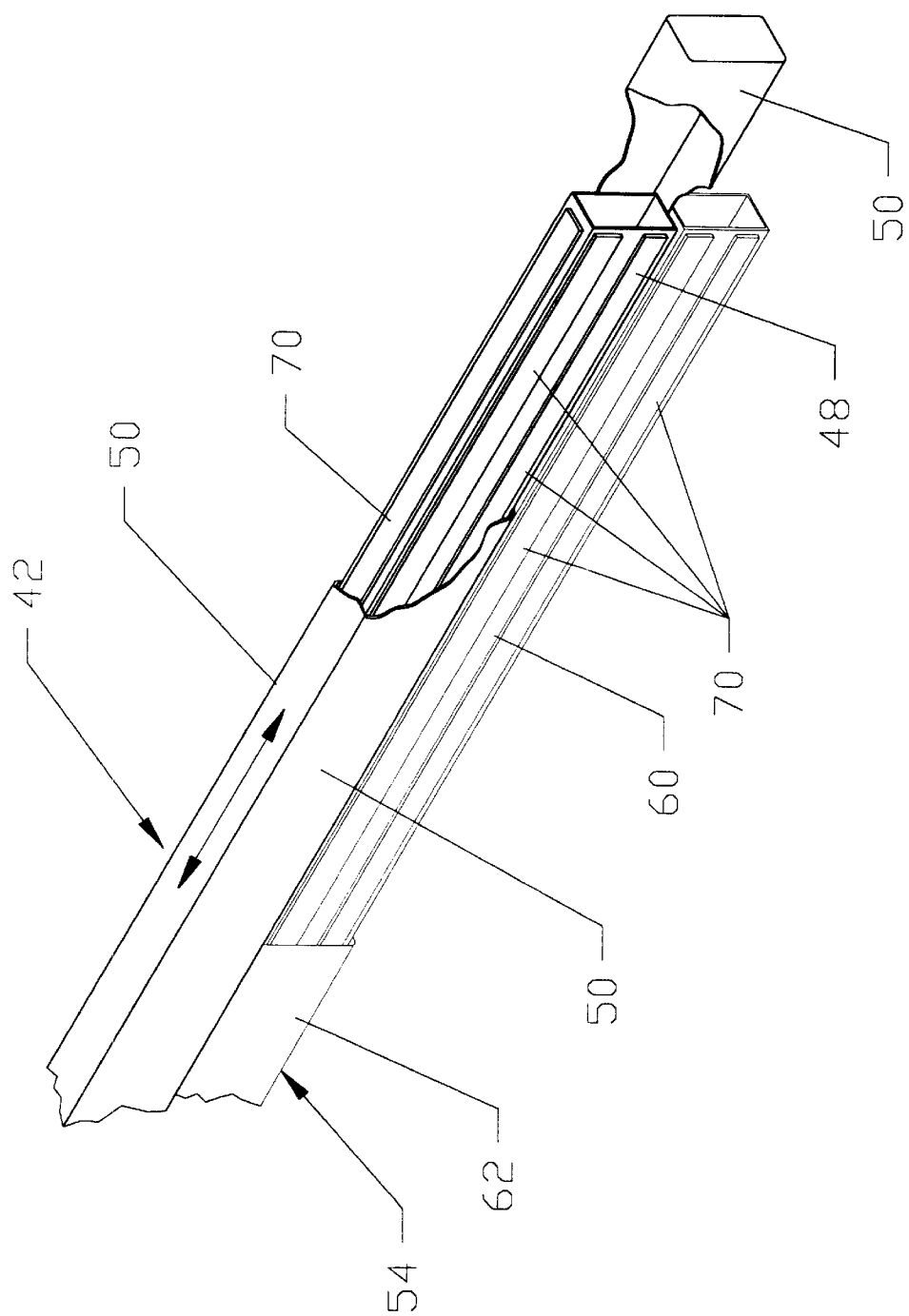
FIG. 3 is schematic pictorial diagram illustrating the lower pair of telescoping retrieval tubes and bearing tubes employed in the article retrieval system of FIGS. 1 and 2.
Figure 4:
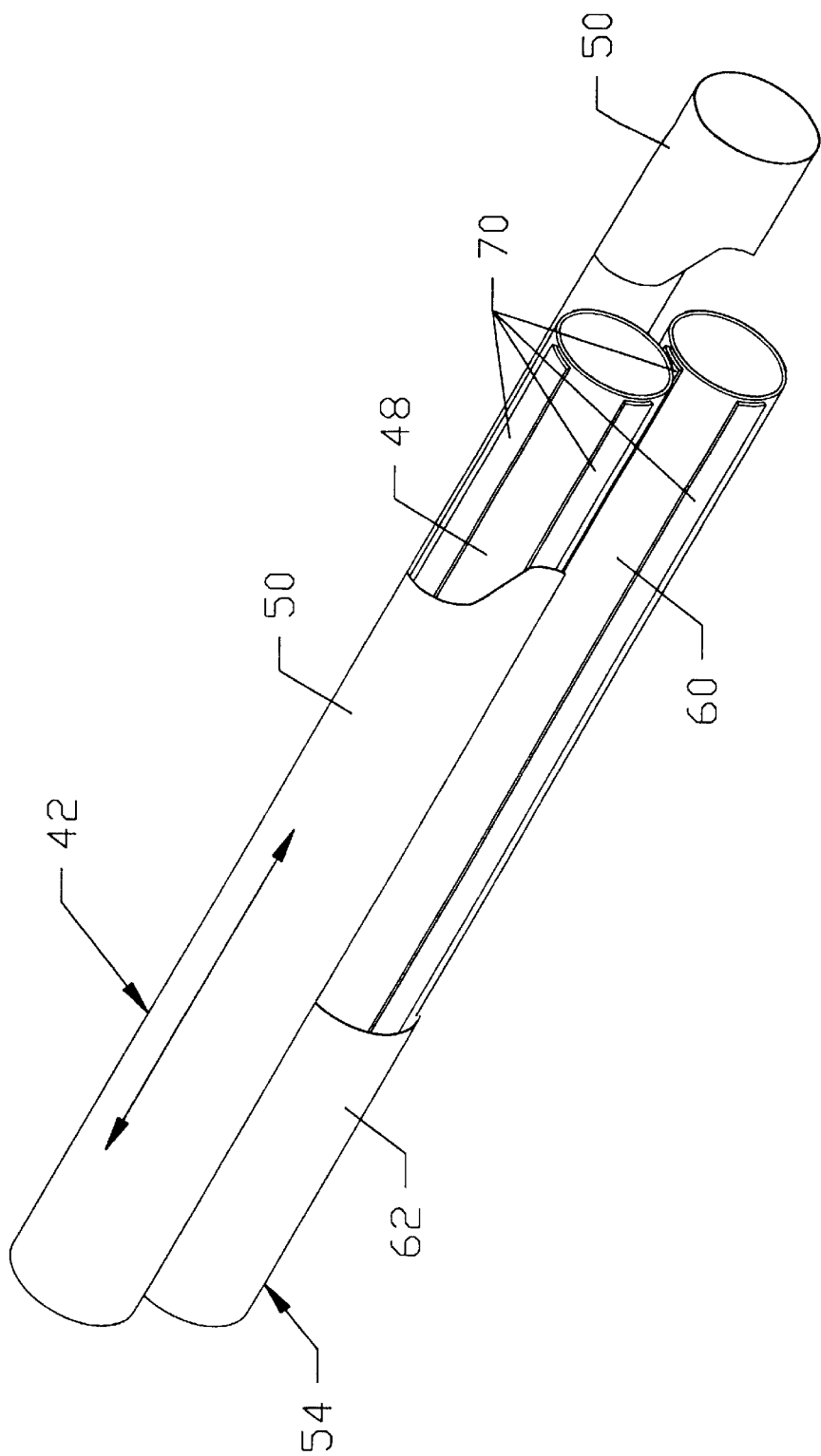
FIG. 4 is a schematic pictorial diagram illustrating the lower pair of telescoping retrieval tubes and bearing tubes as in FIG. 3, except that the tubes are circular in cross section.

Referring now to the detailed pictorial diagrams of FIGS. 2–4, there are shown upper and lower telescoping retrieval tube assemblies 40 and 42. Upper telescoping retrieval tube assembly 40 comprises a fixed inner tube 44 and a movable outer tube 46. Similarly, lower telescoping retrieval tube assembly 42 comprises a fixed inner tube 48 and a movable outer tube 50. Associated with and coupled to the upper and lower telescoping retrieval tube assemblies 40 and 42 are upper and lower bearing tube assemblies 52 and 54. Upper bearing tube assembly 52 comprises a fixed inner tube 56 and a movable outer tube 58, while lower bearing tube assembly 54 similarly comprises a fixed inner tube 60 and a movable outer tube 62. Retrieval tube assemblies 40, 42, as well as bearing tube assemblies 52, 54, are preferably fabricated of a non-metallic plastic or carbon fiber material to minimize their weight. Most importantly, each of the inner tubes 44, 48, 56, and 60 include bearing strips 70, comprising a plastic bearing material, such as ultra high molecular weight (UHMW) plastic bearing material, for example, on each of the four outer surfaces thereof, to act as bearing surfaces over which outer tubes 46, 50, 58, and 62 slide. Bearing strips 70 may be attached to the inner tubes 44, 48, 56, 60 by any conventional means, such as pressure sensitive adhesive.

The outer tubes 46, 50, 54, 58 are driven in concert between predetermined first and second stop positions by means of a cable system, for example, that generally comprises a servo motor 1, two idler pulleys 2, a drive pulley 3, and a cable 8. A belt drive system may be substituted for the cable drive system illustrated. If desired, the bearing tube assemblies 52, 54 may be eliminated, in which case the cable or other drive system operates to drive the retrieval tube assemblies 40, 42.

A number of receivers 11 or other suitable capture devices are mounted on outer tubes 46 and 50 in correspondence with the position of the molded articles as they are ejected from the mold 112. A vacuum manifold 12, to which the inner tubes 44 and 48 are mounted, receives vacuum from a conventional external source through a vacuum inlet 16 and is drawn through the inner tubes 44 and 48, as illustrated by arrows in FIG. 2. Vacuum ports 5 in the outer tubes 46, 50, over which each of the receivers 11 is mounted, serve to draw molded articles from mold 112.

The article retrieval system of the present invention is controlled during operation as described in detail in the above-referenced U.S. Pat. No. 5,234,328.

I claim:

1. An article retrieval apparatus for removing a plurality of articles formed by a manufacturing apparatus upon ejection therefrom, the article retrieval apparatus comprising:

support means positioned adjacent the manufacturing apparatus;

a bearing tube assembly comprising a non-metallic inner bearing tube fixedly attached to the support means, the inner bearing tube having a plurality of plastic bearing strips longitudinally positioned on an outer surface thereof, each one of the plurality of plastic bearing strips being flat in cross section and extending substantially the entire length of the inner bearing tube, the bearing tube assembly further comprising a non-metallic outer bearing tube arranged for sliding engagement with the plastic bearing strips on the inner bearing tube, each of the inner and outer bearing tubes having a cross section that represents a closed geometric shape;

a retrieval tube assembly positioned parallel to and in close proximity to the bearing tube assembly such that it is supported by the bearing tube assembly, the retrieval tube assembly comprising a non-metallic inner retrieval tube fixedly attached to the support means, the inner retrieval tube having a plurality of plastic bearing strips longitudinally positioned on an outer surface thereof, each one of the plurality of plastic bearing strips being flat in cross section and extending substantially the entire length of the inner retrieval tube, the retrieval tube assembly further comprising a non-metallic outer retrieval tube arranged for telescoping engagement with the plastic bearing strips on the inner retrieval tube, each of the inner and outer retrieval tubes having a cross section that represents a closed geometric shape like that of said inner and outer bearing tubes;

drive means, controllably coupled for driving the outer bearing tube and the outer retrieval tube between predetermined first and second stop positions; and a plurality of article capture devices, mounted on the outer retrieval tube, the plurality of article capture devices being positioned to be proximate the locations of the plurality of formed articles as they are ejected from the manufacturing apparatus when the outer retrieval tube is in the second stop position and to be clear of the manufacturing apparatus when the outer retrieval tube is in the first stop position.

2. An article retrieval apparatus as in claim 1, wherein the bearing tube assembly and the retrieval tube assembly are horizontally positioned.

3. An article retrieval apparatus as in claim 1, wherein the drive means comprises cable drive means.

4. An article retrieval apparatus as in claim 1, wherein the inner and outer bearing tubes and the inner and outer retrieval tubes comprise a carbon fiber material.

5. An article retrieval apparatus as in claim 1, wherein the plurality of plastic bearing strips comprise a UHMW plastic bearing material.

6. An article retrieval apparatus as in claim 1, wherein the inner and outer bearing tubes and the inner and outer retrieval tubes are rectangular in cross section.

7. An article retrieval apparatus as in claim 1, wherein the inner and outer bearing tubes and the inner and outer retrieval tubes are circular in cross section.

8. An article retrieval apparatus as in claim 1, further comprising an additional bearing tube assembly and an additional retrieval tube assembly, both being positioned parallel to and spaced apart from said bearing tube assembly and said retrieval tube assembly.

9. An article retrieval apparatus for removing a plurality of articles formed by a manufacturing apparatus upon ejection therefrom, the article retrieval apparatus comprising:

support means positioned adjacent the manufacturing apparatus;

a retrieval tube assembly comprising a non-metallic inner retrieval tube fixedly attached to the support means, the inner retrieval tube having a plurality of plastic bearing strips longitudinally positioned on an outer surface thereof, each one of the plurality of plastic bearing strips being flat in cross section and extending substantially the entire length of the inner retrieval tube, the retrieval tube assembly further comprising a non-metallic outer retrieval tube arranged for telescoping engagement with the plastic bearing strips on the inner retrieval tube, each of the inner and outer retrieval tubes having a cross section that represents a closed geometric shape;

drive means, controllably coupled for driving the outer retrieval tube between predetermined first and second stop positions;

a plurality of article capture devices, mounted on the outer retrieval tube, the plurality of article capture devices being positioned to be proximate the locations of the plurality of formed articles as they are ejected from the manufacturing apparatus when the outer retrieval tube is in the second stop position and to be clear of the manufacturing apparatus when the outer retrieval tube is in the first stop position; and a plurality of vacuum ports positioned along the inner retrieval tube, between the plurality of plastic bearing strips, and facing a side of the outer retrieval tube on which the plurality of article capture devices are mounted to enable vacuum to be supplied to the plurality of capture devices from within the inner retrieval tube as the outer retrieval tube is driven between said first and second stop positions.

* * * * *